(12) United States Patent
Cors et al.

(10) Patent No.: US 9,172,639 B2
(45) Date of Patent: *Oct. 27, 2015

(54) DISTRIBUTING FUNCTIONS IN A DISTRIBUTED AND EMBEDDED ENVIRONMENT

(71) Applicant: International Business Machines Corporation, Armonk, NY (US)

(72) Inventors: Josep Cors, Rochester, MN (US); David R. Engebretsen, Cannon Falls, MN (US); David L. Hermsmeier, Oronocco, MN (US); Adam C. Lange-Pearson, Rochester, MN (US); Ward R. Nelson, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 367 days.

This patent is subject to a terminal disclaimer.

(21) Appl. No.: 13/736,702

(22) Filed: Jan. 8, 2013

(65) Prior Publication Data

US 2013/0142202 A1    Jun. 6, 2013

Related U.S. Application Data

(63) Continuation of application No. 13/311,964, filed on Dec. 6, 2011.

(51) Int. Cl.
*H04L 12/721* (2013.01)
*H04L 12/725* (2013.01)
*H04L 12/741* (2013.01)

(52) U.S. Cl.
CPC ............. *H04L 45/44* (2013.01); *H04L 45/304* (2013.01); *H04L 45/745* (2013.01)

(58) Field of Classification Search
CPC . H04L 12/4641; H04L 12/4625; H04L 47/10; H04L 45/04; H04L 45/50
See application file for complete search history.

(56) References Cited

U.S. PATENT DOCUMENTS

| 6,578,068 | B1 | 6/2003 | Bowman-Amuah |
| 7,380,039 | B2 | 5/2008 | Miloushev et al. |
| 7,420,952 | B2 | 9/2008 | da Costa et al. |
| 7,730,220 | B2 | 6/2010 | Hasha et al. |
| 2004/0179546 | A1* | 9/2004 | McDaniel et al. ............ 370/463 |
| 2006/0291388 | A1 | 12/2006 | Amdahl et al. |
| 2010/0235847 | A1 | 9/2010 | Brehmer et al. |
| 2011/0264610 | A1* | 10/2011 | Armstrong et al. ............ 706/12 |
| 2011/0307718 | A1* | 12/2011 | Aybay et al. .................. 713/310 |

FOREIGN PATENT DOCUMENTS

EP    1791058 A1    5/2007

OTHER PUBLICATIONS

Cors et al.: "Distributing Functions in a Distributed and Embedded Environment", U.S. Appl. No. 13/311,964, filed Dec. 6, 2011.

* cited by examiner

*Primary Examiner* — Jung Park
(74) *Attorney, Agent, or Firm* — Patterson & Sheridan, LLP

(57) ABSTRACT

The different switch modules making up a distributed virtual switch may route configuration commands for hardware resources to different modules within the distributed switch using a distribution and routing layer. At least one of the switch modules maintains a routing table that defines which switch modules are responsible for which hardware resources. The switch module uses the routing tables to forward the commands on the distribution and routing layer to the responsible switch module which then ensures that the relevant hardware resources are configured.

8 Claims, 7 Drawing Sheets

Routing Table 1

| Interface : Unicast | |
|---|---|
| Resource | Responsible Module |
| $R_0 - R_5$ | Switch Module 1 |
| $R_6$ | Switch Module 2 |
| ... | ... |
| $R_N$ | Switch Module N |

Routing Table 2

| Interface : Broadcast | |
|---|---|
| Resource | Responsible Module |
| $R_0 - R_N$ | Switch Module 1 |

Routing Table 3

| Interface : Broadcast | |
|---|---|
| Resource | Responsible Module |
| $R_0$ | Switch Module 1 |
| $R_1$ | Switch Module 2 |
| ... | ... |
| $R_N$ | Switch Module N |

FIG. 5

DISTRIBUTING FUNCTIONS IN A DISTRIBUTED AND EMBEDDED ENVIRONMENT

CROSS-REFERENCED RELATED APPLICATIONS

This application is a continuation of co-pending U.S. patent application Ser. No. 13/311,964, filed Dec. 6, 2011. The aforementioned related patent application is herein incorporated by reference in its entirety.

BACKGROUND

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or PCIe slots, as well as permit communication between servers in the same or different chassis.

SUMMARY

Embodiments of the invention provide a method, system and computer program product computer for routing commands in a distributed switch that includes a plurality of switch modules. The method, system and computer program product comprise receiving a command on a first switch module of the plurality of switch modules where the command instructs the distributed switch to configure a setting of a hardware element in the distributed switch. The method, system and computer program product also include determining a target switch module of the plurality of switch modules that is responsible for the hardware element based on a routing table and routing the command from the first switch module to the target switch module. Moreover, the plurality of switch modules is interconnected within the distributed switch by a fabric. The method, system and computer program product include configuring the hardware element based on the received command.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 5 illustrates routing tables, according to one embodiment of the invention.

DETAILED DESCRIPTION

Figure 1:
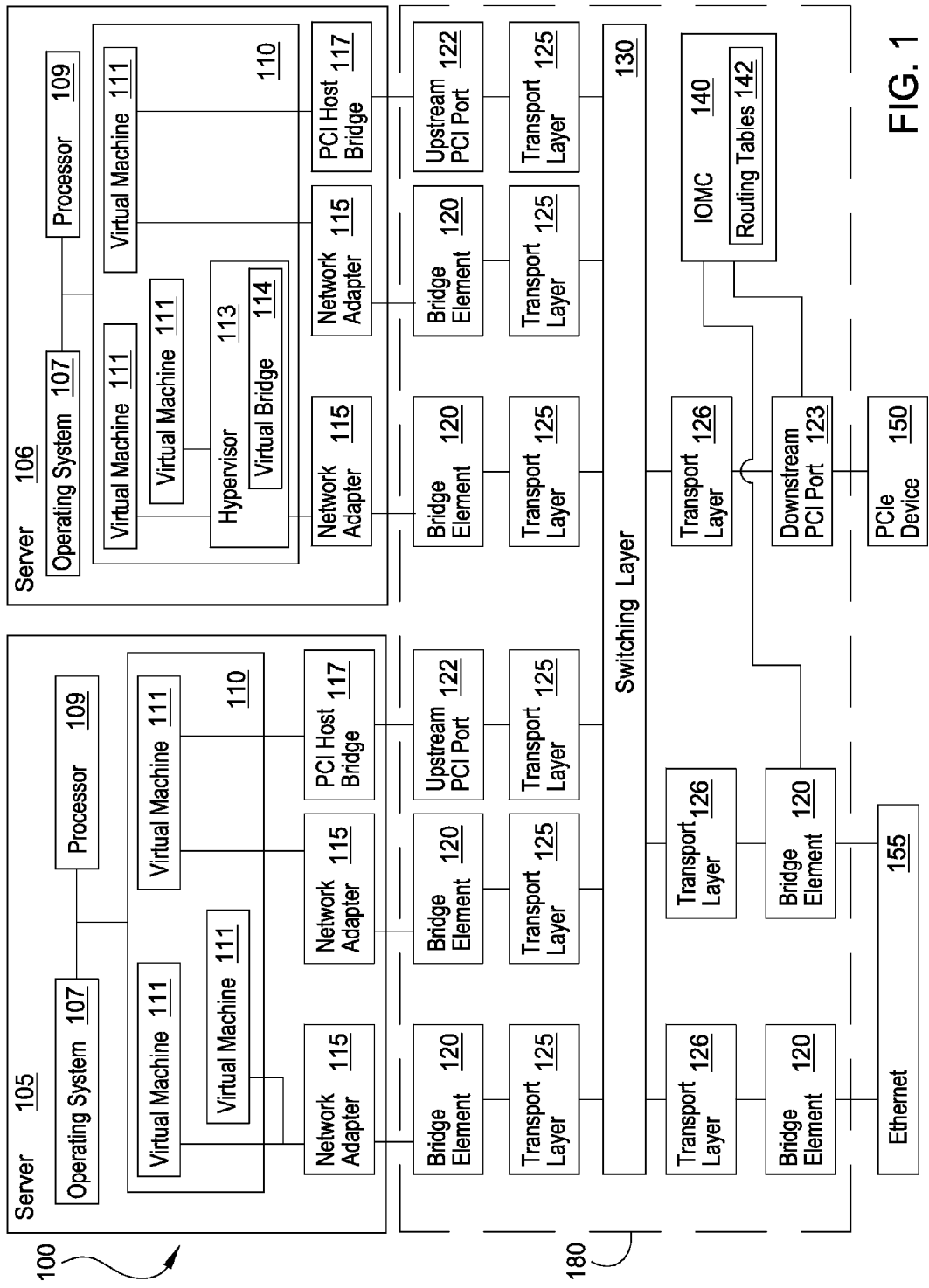
FIG. 1 illustrates a system architecture that includes a virtual switch, according to one embodiment of the invention.

A distributed, virtual switch may appear as a single switch element to a computing system (e.g., a server) connected to the distributed switch. In reality, the distributed switch may include a plurality of different switch modules that are interconnecting via a switching layer such that each of the switch modules may communicate with any other of the switch modules. For example, a computing system may be physically connected to a port of one switch module but, using the switching layer, is capable of communicating with a different switch module that has a port connected to a WAN (e.g., the Internet). To the computing system, the two separate switch modules appear to be one single switch. Moreover, each of the switch modules may be configured to accept and route data based on two different communication protocols.

A distributed switch, however, needs a way of routing configuration commands for hardware resources on the different switch modules. To accomplish this, a switch module may maintain one or more routing tables that define which switch modules are responsible for which hardware resources. Advantageously, the routing tables permit the switch modules to divide the responsibility for updating and configuring the different hardware elements in the distributed switch. After receiving a command to change a setting of a hardware element, a switch module uses the routing tables to forward the commands on a distribution and routing layer (DRL) to the responsible switch module which then ensures that the relevant hardware resource(s) are configured.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud being run or stored on the servers. For example, an application could execute on a server implementing the virtual switch in the cloud. Doing so allows a user to access this information from any computing system attached to a network connected to the cloud (e.g., the Internet).

FIG. 1 illustrates a system architecture that includes a virtual switch, according to one embodiment of the invention. The first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may include memory storage physically located in the server 105 or on another computing device coupled to the server 105.

The server 105 may operate under the control of an operating system 107 and execute various computer software applications, components, programs, objects, modules, and data structures, such as virtual machines 111.

The server 105 may include network adapters 115 (e.g., converged network adapters). A converged network adapter may include single root I/O virtualization (SR-IOV) adapters such as a Peripheral Component Interconnect Express (PCIe) adapter that supports Converged Enhanced Ethernet (CEE). Another embodiment of the system 100 may include a multi-root I/O virtualization (MR-IOV) adapter. The network adapters 115 may further be used to implement a Fiber Channel over Ethernet (FCoE) protocol, RDMA over Ethernet, Internet small computer system interface (iSCSI), and the like. In general, a network adapter 115 transfers data using an Ethernet or PCI based communication method and may be coupled to one or more of the virtual machines 111. Additionally, the adapters may facilitate shared access between the virtual machines 111. While the adapters 115 are shown as being included within the server 105, in other embodiments, the adapters may be physically distinct devices that are separate from the server 105.

In one embodiment, each network adapter 115 may include a converged adapter virtual bridge (not shown) that facilitates data transfer between the adapters 115 by coordinating access to the virtual machines 111. Each converged adapter virtual bridge may recognize data flowing within its domain (i.e., addressable space). A recognized domain address may be routed directly without transmitting the data outside of the domain of the particular converged adapter virtual bridge.

Each network adapter 115 may include one or more Ethernet ports that couple to one of the bridge elements 120. Additionally, to facilitate PCIe communication, the server may have a PCI Host Bridge 117. The PCI Host Bridge would then connect to an upstream PCI port 122 on a switch element in the virtual switch 180. The data is then routed via the switching layer 130 to the correct downstream PCI port 123 which may be located on the same or different switch module as the upstream PCI port 122. The data may then be forwarded to the PCI device 150.

The bridge elements 120 may be configured to forward data frames throughout the distributed virtual switch 180. For example, a network adapter 115 and bridge element 120 may be connected using two 40 Gbit Ethernet connections or one 100 Gbit Ethernet connection. The bridge elements 120 forward the data frames transmitted by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed switch 180.

The distributed virtual switch 180, in general, includes a plurality of bridge elements 120 that may be located on a plurality of a separate, though interconnected, hardware components. To the perspective of the network adapters 115, the virtual switch 180 acts like one single switch even though the switch 180 may be composed of multiple switches that are physically located on different components. Distributing the switch 180 provides redundancy in case of failure.

Each of the bridge elements 120 may be connected to one or more transport layer modules 125 that translate received data frames to the protocol used by the switching layer 130. For example, the transport layer modules 125 may translate data received using either an Ethernet or PCI communication method to a generic data type (i.e., a cell) that is transmitted via the switching layer 130 (i.e., a cell fabric). Thus, the switch modules comprising the switch 180 are compatible with at least two different communication protocols—e.g., the Ethernet and PCIe communication standards. That is, at least one switch module has the necessary logic to transfer different types of data on the same switching layer 130.

Although not shown in FIG. 1, in one embodiment, the switching layer 130 may comprise a local rack interconnect which connects bridge elements 120 located within the same chassis and rack, as well as links that connect to bridge elements 120 in other chassis and racks.

After routing the cells, the switching layer 130 may communicate with transport layer modules 126 that translate the cells back to data frames that correspond to their respective communication protocols. A portion of the bridge elements 120 may facilitate communication with an Ethernet network 155 which provides access to a LAN or WAN (e.g., the Internet). Moreover, PCI data may be routed to a downstream PCI port 123 that connects to a PCIe device 150. The PCIe device 150 may be a passive backplane interconnect, as an expansion card interface for add-in boards, or common storage that can be accessed by any of the servers connected to the switch 180.

A second server 106 may include a processor 109 connected to an operating system 107 and memory 110 which includes one or more virtual machines 111 similar to those found in the first server 105. The memory 110 of server 106 also includes a hypervisor 113 with a virtual bridge 114. The hypervisor 113 manages data shared between different virtual machines 111. Specifically, the virtual bridge 114 allows direct communication between connected virtual machines 111 rather than requiring the virtual machines 111 to use the bridge elements 120 or switching layer 130 to transmit data to other virtual machines 111 communicatively coupled to the hypervisor 113.

An Input/Output Management Controller (IOMC) 140 (i.e., a special purpose processor) is coupled to at least one bridge element 120 which provides the IOMC 140 with access to the switching layer 130. One function of the IOMC 140 may be to receive commands from an administrator to configure the different hardware elements of the distributed virtual switch 180. In one embodiment, these commands may be received from a separate switching network from the switching layer 130.

Although one IOMC 140 is shown, the system 100 may include a plurality of IOMCs 140. In one embodiment, these IOMCs 140 may be arranged in a hierarchy such that one IOMC 140 is chosen as a master while the others are delegated as members (or slaves).

The IOMC 140 may include routing tables 142 that define which configurable hardware elements in the distributed virtual switch 180 are "owned" by which switch module. In an embodiment, a single switch module may be designated as the switch module that always receives commands to configure the hardware elements in the switch 180. Accordingly, the IOMC 140 of the designated switch module contains all the routing tables 142 for the switch 180. After the designated switch module receives a command to configure a hardware element—e.g., a port on a bridge element 120—it determines the switch module that owns that hardware element and forwards the command to the IOMC of the responsible switch module. This process will be discussed in further detail later.

In another embodiment, a single switch module is not designated as the sole receipt of commands to configure the hardware resources. In this case, each IOMC 140 in the virtual switch 180 may have a complete set of routing tables 142 that are coherently maintained. In this manner, any IOMC 140 can route the command to the responsible switch module.

Figure 2:
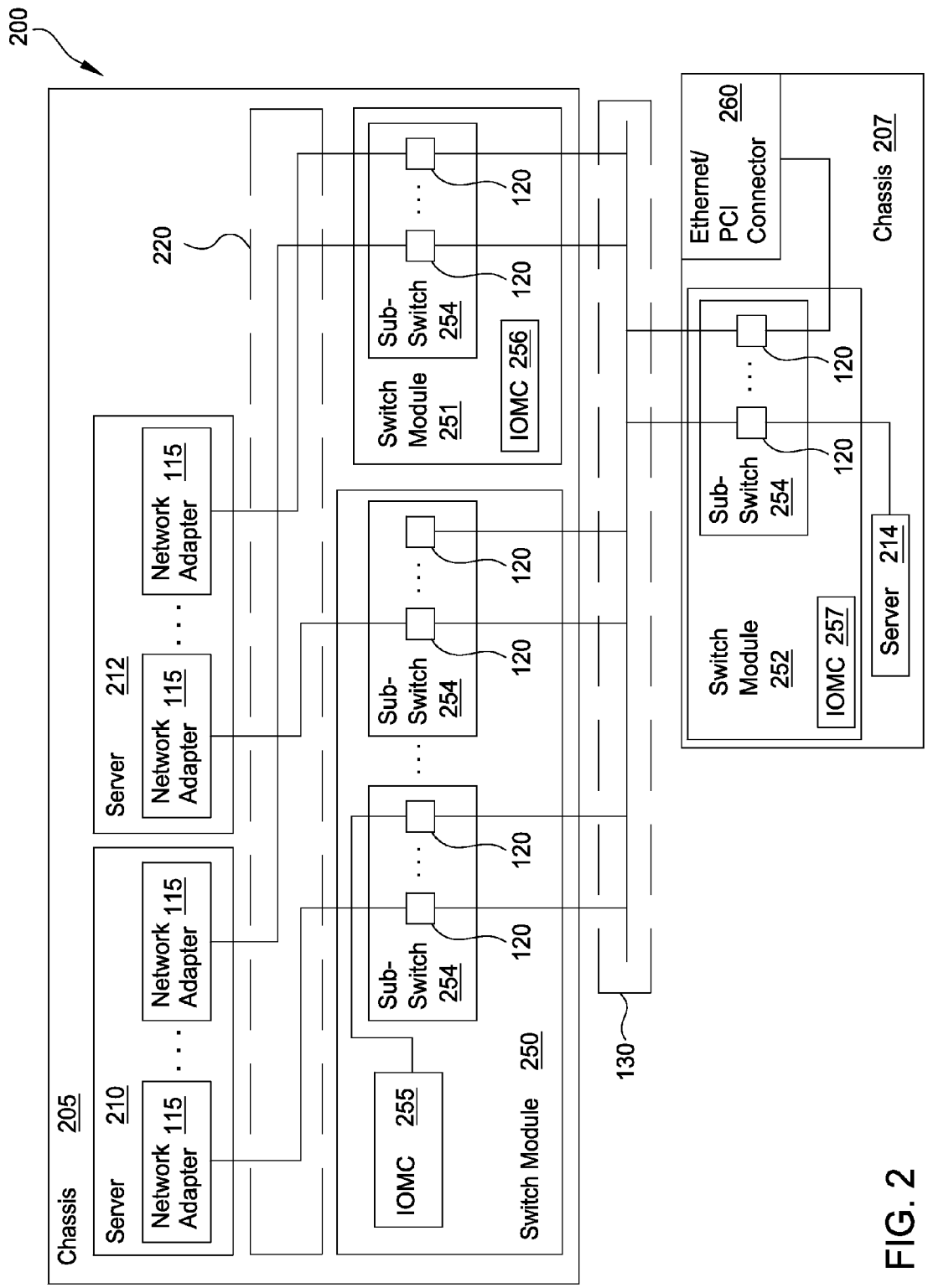
FIG. 2 illustrates the hardware representation of a system that implements a virtual switch, according to one embodiment of the invention.

FIG. 2 illustrates a hardware level diagram of the system 100, according to one embodiment. Server 210 and 212 may be physically located in the same chassis 205; however, the chassis 205 may include any number of servers. The chassis 205 also includes a plurality of switch modules 250, 251 that include one or more sub-switches 254. In one embodiment, the switch modules 250, 251, 252 are hardware components (e.g., PCB boards, FPGA boards, system on a chip, etc.) that provide physical support and connectivity between the network adapters 115 and the bridge elements 120. In general, the switch modules 250, 251, 252 include hardware that connects different chassis 205, 207 and servers 210, 212, 214 in the system 200.

The switch modules 250, 251, 252 (i.e., a chassis interconnect element) include one or more sub-switches 254 and an IOMC 255, 256, 257. The sub-switches 254 may include a logical or physical grouping of bridge elements 120. Each bridge element 120 may be physically connected to the servers 210, 212. For example, a bridge element 120 may route data sent using either Ethernet or PCI communication protocols to other bridge elements 120 attached to the switching layer 130. However, in one embodiment, the bridge element 120 may not be needed to provide connectivity from the network adapter 115 to the switching layer 130 for PCI or PCIe communications.

Each switch module 250, 251, 252 includes an IOMC 255, 256, 257 for managing and configuring the different hardware resources in the system 200. In one embodiment, the respective IOMC for each switch module 250, 251, 252 may be responsible for configuring the hardware resources on the particular switch module. However, because the switch modules are interconnected using the switching layer 130, an IOMC on one switch module may manage hardware resources on a different switch module. As discussed above, the IOMCs 255, 256, 257 are attached to at least one bridge element in each switch module 250, 251, 252 which enables each IOMC to route commands on the switching layer 130. For clarity, these connections for IOMCs 256 and 257 have been omitted. Moreover, switch modules 251, 252 may include multiple sub-switches 254.

The dotted line in chassis 205 defines the midplane 220 between the servers 210, 212 and the switch modules 250, 251. That is, the midplane 220 includes the data paths that transmit data between the network adapters 115 and the sub-switches 254.

Each bridge element 120 connects to the switching layer 130. In addition, a bridging element 120 may also connect to a network adapter 115 or an uplink. As used herein, an uplink port of a bridging element 120 provides a service that expands the connectivity or capabilities of the system 200. As shown in chassis 207, one bridging element 120 includes a connection to an Ethernet or PCI connector 260. For Ethernet communication, the connector 260 may provide the system 200 with access to a LAN or WAN (e.g., the Internet). Alternatively, the port connector 260 may connect the system to a PCIe expansion slot—e.g., PCIe device 150. The device 150 may be additional storage or memory which each server 210, 212, 214 may access via the switching layer 130. Advantageously, the system 200 provides access to a switching layer 130 that has network devices that are compatible with at least two different communication methods.

As shown, a server 210, 212, 214 may have a plurality of network adapters 115. This provides redundancy if one of these adapters 115 fails. Additionally, each adapter 115 may be attached via the midplane 220 to a different switch module 250, 251, 252. As illustrated, one adapter of server 210 is communicatively coupled to a bridge element 120 located in switch module 250 while the other adapter is connected to a bridge element 120 in switch module 251. If one of the switch modules 250, 251 fails, the server 210 is still able to access the switching layer 130 via the other switching module. The failed switch module may then be replaced (e.g., hot-swapped) which causes the IOMCs 255, 256, 257 and bridging elements 120 to update the routing tables and lookup tables to include the hardware elements on the new switching module.

Figure 3:
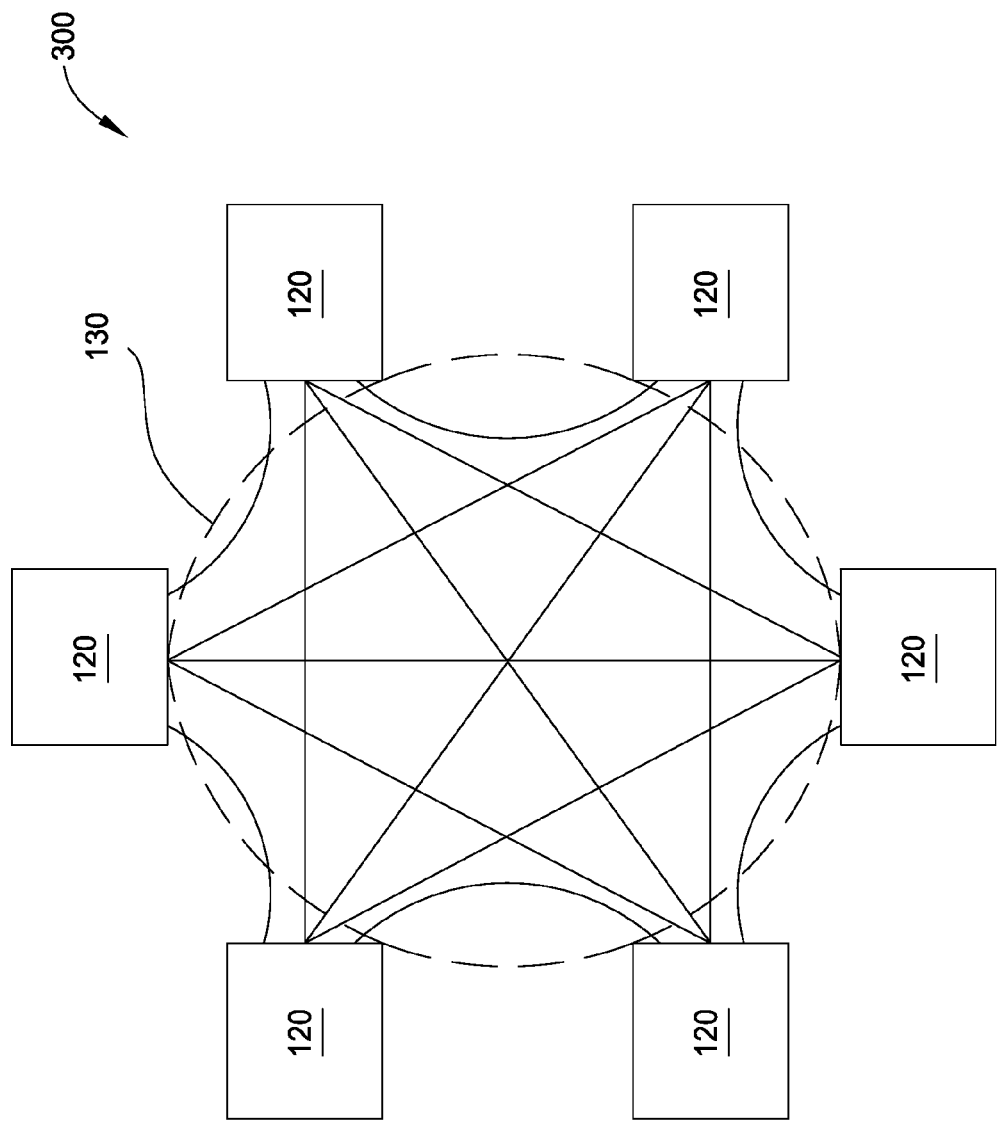
FIG. 3 illustrates a virtual switch, according to one embodiment of the invention.

FIG. 3 illustrates a virtual switching layer, according to one embodiment of the invention. Each bridging element 120 in the systems 100 and 200 are connected to each other using the switching layer 130 via a mesh connection schema. That is, no matter the bridging element 120 used, a cell (i.e., data packet) can be routed to another other bridging element 120 located on any other switch module 250, 251, 252. This may be accomplished by directly connecting each bridging element 120—i.e., each bridging element 120 has a dedicated data path to every other bridging element 120. Alternatively, the switching layer 130 may use a spine-leaf architecture where each bridging element 120 (i.e., a leaf node) is attached to at least one spine node. The spine nodes route cells received from the bridging elements 120 to the correct spine node which then forwards the data to the correct bridging element 120. However, this invention is not limited to any particular technique for interconnecting the bridging elements 120.

Figure 4:
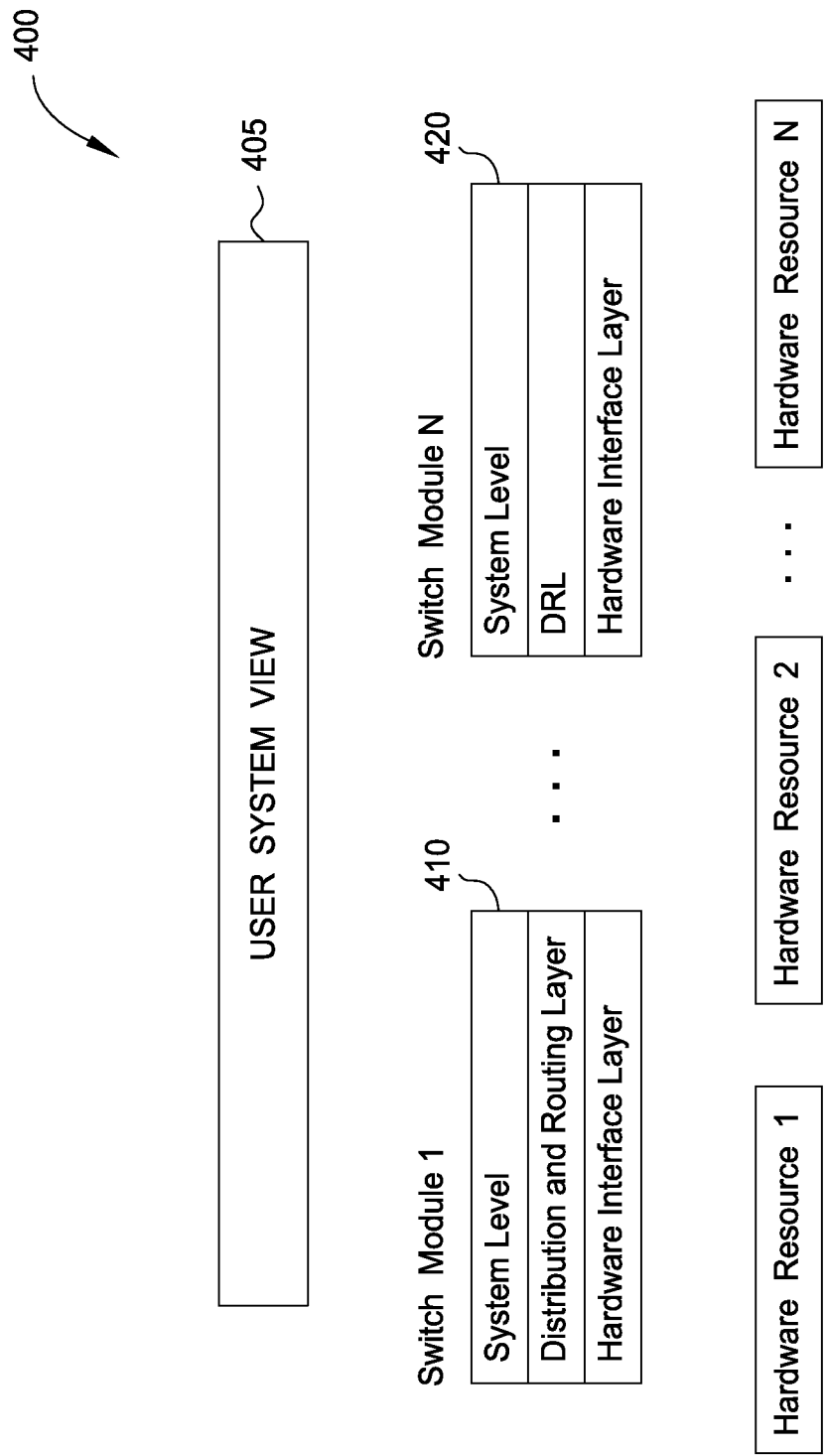
FIG. 4 illustrate a logical view of the systems illustrated in FIGS. 1 and 2, according to one embodiment.

FIG. 4 illustrate a logical view of the systems illustrated in FIGS. 1 and 2, according to one embodiment. The system 400, for example, may be the logical view for the systems 100 or 200. The user system view 405 illustrates that an administrator may access any of the switch modules in the system 400. Specifically, from the user system view 405, the administrator does not know which of the switch modules is servicing her commands or requests. For example, if an administrator sends a command to the system 400, it does not matter which switch module receives and handles the command because all the switch modules 250, 251, 252 are interconnected via the switching layer 130 to form the virtual switch 180. Accordingly, one of the plurality of switch modules may be designated as the module that receives the commands from the user system view 405. For example, as discussed earlier, an IOMC on a switch module may be connected to a separate dedicated switch that facilitates communication with an administrator.

The system 400 may include a plurality of switch modules 1-N. Each switch module may be divided into logical layers: a system level, DRL, and hardware interface layer (HIL). The system level layer (also called a pod layer) treats each switch module as a single switch. That is, the IOMC for each switch module is capable of communicating with and controlling hardware on any other switch module. Thus, the data is synchronized across the switch modules so that any of the switch modules has the system level view. However, a particular IOMC may be assigned to control only a subset of the hardware elements in the virtual switch 180. For example, once a command from an administrator is received at the system level layer, the switch module may determine if its IOMC is assigned to control the hardware that is associated with received command. If the command is to change the speed of a particular port, but that port is the responsibility of a different switch module, the switch module will push that command down to the DRL to be forwarded to the correct switch module and IOMC.

The DRL represents the routing performed by the IOMCs in each of the switch modules. As shown in FIG. 1, each IOMC 140 includes routing tables 142. The routing logic and routing tables 142 may be part of the firmware of the IOMC chip. In general, the routing tables 142 include the information necessary to determine which IOMC is responsible for (or owns) which hardware elements and the particular functions of the hardware elements. That is, the routing tables 142 define how to route to the proper HIL. The HIL then provides the local access to the hardware resources that are to be updated. For example, a hardware element (e.g., ports, a bridge element 120, PCIe port, uplink manager, etc.) may have multiple configurable settings such as a port speed or port connectivity (e.g., two 40 Gbit connections or one 100 Gbit connection). Accordingly, IOMC 250 may be responsible for updating the port speed but IOMC 251 may be responsible for changing the connectivity of a port.

Specifically, the DRL routes the configuration instruction from an upstream port to a downstream port on a switch module 250. The routing tables 142 ensure that the correct downstream port is used which provides access to the HIL of the targeted hardware element to be configured.

The HIL is a local layer. It is the layer used by the IOMCs to access the local resources on a particular switch module. In one embodiment, the HIL is firmware that communicates with the hardware (or the registers associated with the hardware).

FIG. 5 illustrates routing tables 142, according to one embodiment of the invention. Each routing table 142 includes an interface, a resource column and responsible module column. The interface may be a unicast, broadcast, multicast, and the like. Routing table 1 includes a unicast interface while routing tables 2 and 3 are broadcast interfaces.

When a switch module receives the command via the system level, the switch module identifies the routing table 142 associated with the command. For example, if the command instructs the switch to change the port speed of R6 and routing table 1 is used when the switch module receives a command to change port's speed, the switch module determines if it is the responsible module. In this case, if the switch module that received the command is not switch module 2, then the switch module would forward the command using the DRL to switch module 2 (i.e., a sideband transaction). The IOMC of switch module 2 would receive and then forward the command directly to the HIL.

A broadcast, in contrast, instructs the switch module that received the command from the system level to use the DRL to forward the command to all the responsible switch modules listed in the routing table. For example, if the command instructs the distributed switch to changes a setting that is controlled by routing table 3, the IOMC of the current switch module would transmit the command on the DRL using sideband transactions to switch modules 1-N which would then forward the command to their associated HIL. However, if the command was associated with routing table 2, the broadcast interface requires the current switch module to forward the command only to switch module 1 which then forwards the command to its HIL for completion. In general, a broadcast interface does not require the IOMC that initially received the command to match a particular hardware resource defined in the command to a particular responsible switch module; instead, the command is immediately routed to all the responsible switch modules. A broadcast interface may be useful when the command is a global update for the same type of hardware resource. The differences between a unicast and broadcast interface will be discussed further below.

The resource column defines which switch module is responsible for which hardware resource. Each hardware resource in the virtual switch may be owned by a switch module, however, each switch module does not need to manage a resource. For example, one switch module may have a master IOMC that is in charge of all the hardware resources and their particular functions. In routing table 2, switch module 1 is the "master" for all resource R0-RN but a separate switch module may be the master of hardware resources of a different type. Alternatively, the responsibility for the managing the hardware resources may be divided across all or a subset of the switch modules as shown by routing tables 1 and 3.

In one embodiment, each IOMC on each switch module may store complete and coherent copies of the routing tables 142. In this manner, the administrator could communicate with any of the switch modules and it would have the necessary routing information to forward the command to the responsible switch module(s).

Further, in one embodiment, a switch module may be responsible for hardware resources that are physically located elsewhere in the distributed switch 180. As shown in routing table 1, hardware resources R0-R5 are owned by switch module 1, however, this does not necessarily mean that R0-R5 are physically located on switch module 1. The IOMC of switch module 1 may manage any of the hardware elements in the virtual switch 180 irrespective of their location via the switching layer 130.

The responsible module column defines which switch module is responsible for (or owns) a particular hardware resource. For example, if switch module 1 receives a command from the administrator to configure R6, the IOMC of switch module 1 would use routing table 1 to determine that the command should be forwarded on the DRL to switch module 2. Because each switch module has only one IOMC, in embodiments where multiple IOMCs are located on a switch module, the correct IOMC may also be designated in the routing tables 142.

Note that a routing table may be directed to a type of hardware resource—e.g., Ethernet ports or a PCIe bus—or to just a setting of a hardware resource—e.g., a speed of a port or connectivity of the bus. For example, one routing table may illustrate the responsible switch module for any command that deals with Ethernet ports. Alternatively, the routing table may be broken up into several routing tables that individually define the responsible switch module for a particular setting of the Ethernet ports. For example, if the command instructed the switch 180 to change a particular port's speed, the IOMC would reference a first routing table, but if the command changes the same port's connectivity to a different bridge element 120, the IOMC may reference a second routing table.

Returning to FIG. 4, the HIL may include the necessary registers that control the settings of the hardware resources. The HIL may also include the switching layer 130 or direct connects that couple to the hardware resources. For example, the responsible IOMC may use the switching layer 130 to route a command to a register that is located on a different switch module. Changing the register changes a setting of the associated hardware resource. Alternatively, the hardware resource may be physically located on the responsible switch module. In this case, the IOMC may have a direct connection to the hardware resource that avoids having to use the switching layer 130—i.e., the command is routed completely on the PCB board of the switch module to the hardware resource also located on the PCB board.

Figure 6:
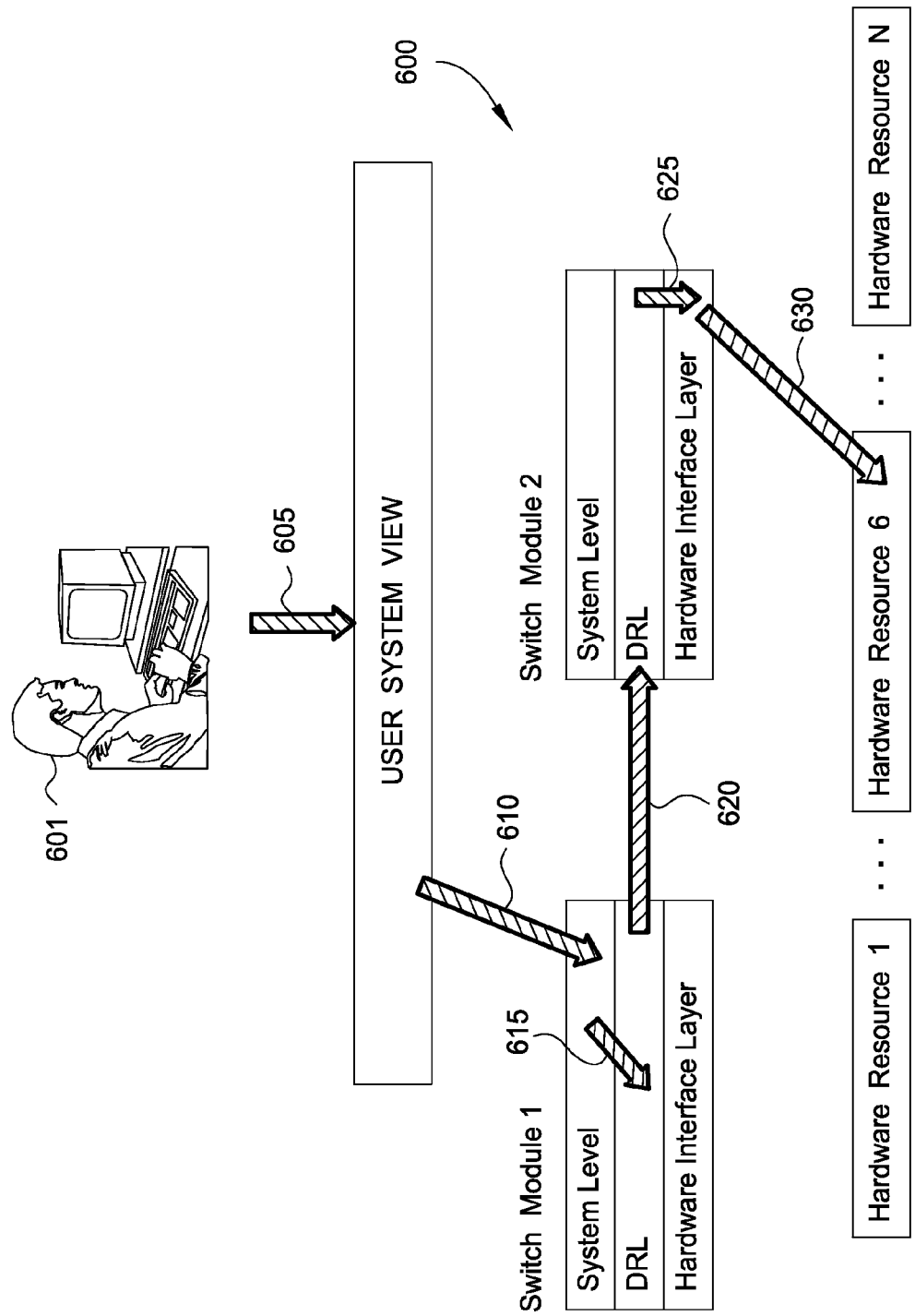
FIG. 6 illustrates the progression of a unicast command through the logical system shown in FIG. 4, according to one embodiment.

FIG. 6 illustrates the progression of a unicast command through the logical system shown in FIG. 4, according to one embodiment. Arrow 605 illustrates the transmission of a command from the administrator 601 to the system 600. From the user system view the command is transferred to switch module 1 as shown by arrow 610. Switch module 1 may be designated as the switch that receives all of the commands from the administrator 601. However, if coherent copies of the routing tables 142 are stored on other switch modules, then they also may receive the commands from the administrator 601.

Arrow 615 illustrates that the switch module 1 may determine whether it is responsible for the resource hardware referenced in the command. For example, using routing table 1 in FIG. 5, if the command is to configure R6, then the IOMC realizes that it does not own that resource. Accordingly, the IOMC pushes the command down to the DRL for re-routing.

Arrow 620 illustrates that the IOMC forwards the command to the responsible switch module—e.g., the IOMC of switch module 2 in the DRL. Specifically, the IOMC may use its connection to a bridge element 120 to transmit a cell on the switching layer 130 to a bridge element 120 on switch module 2 which is then received by the responsible IOMC. In one embodiment, switch module 2 may not have the relevant routing table 142 stored in the firmware of the IOMC. In that case, switch module 2 automatically pushes to the HIL any command received from switch module 1. Alternatively, the switch module 2 (or all the switch modules) may maintain coherent copies of the routing tables 142.

Because switch module 2 is the responsible module, it pushes the command to its HIL as shown by arrow 625. Arrow 630 illustrates that the appropriate registers associated with hardware resource 6 may be altered such that the command is accomplished.

Note that the sideband transaction of arrow 620 and the register configuration of arrow 630 may be accomplished using the switching layer 130. For example, the IOMC may use routing table 1 to forward the command, via the switching layer 130, to switch module 2 and, if hardware resource 6 is physically located on a different hardware component, the IOMC of switch module 2 may also forward the command in the HIL using the switching layer 130 to the appropriate hardware component (e.g., a different switch module).

Figure 7:
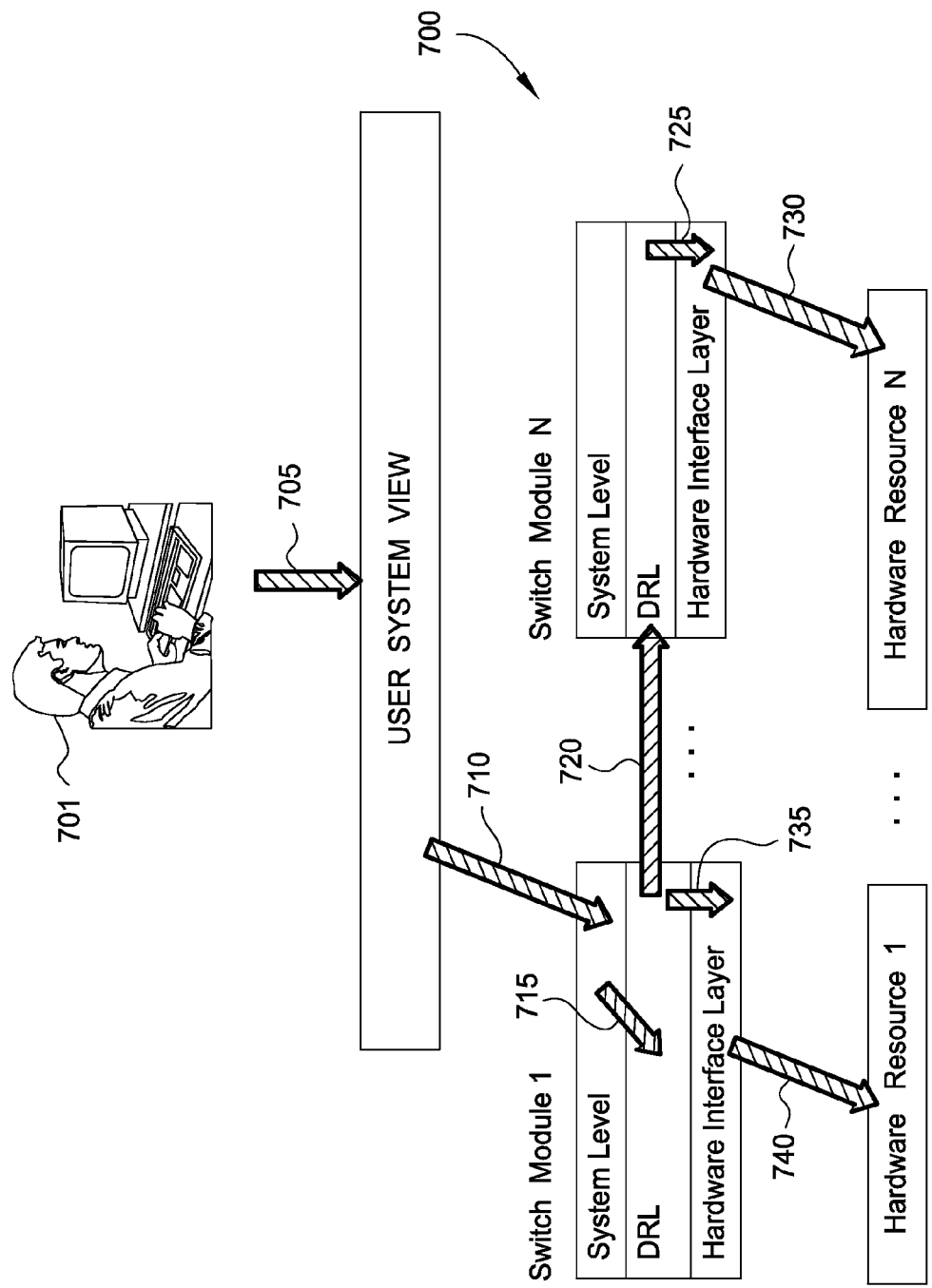
FIG. 7 illustrates the progression of a broadcast command through the logical system shown in FIG. 4, according to one embodiment.

FIG. 7 illustrates the progression of a broadcast command through the logical system shown in FIG. 4, according to one embodiment. Similar to FIG. 6, arrow 705 illustrates the transmission of a command from the administrator 701 to the system 700. As shown by arrow 710, the designated switch module (i.e., switch module 1) receives the command. The command is pushed down into the DRL as illustrated by arrow 715. For example, using routing table 3, the routing characteristic is a broadcast interface which indicates that every resource in the table needs to be update. Accordingly, the IOMC of switch module 1 identifies each switch module listed as a target in routing table 3—i.e., switch modules 1, 2, . . . , N.

Arrow 720 illustrates that switch module 1 transmits to all of the responsible switch modules for the respective hardware resources the command. For example, using the switching layer 130, the IOMC for switch module 1 transmits to the IOMCs of switch modules 2, . . . , N the respective command based on the information contained in routing table 3. Arrows 725 and 735 illustrate that each of the responsible modules, which in this case includes switch module 1, routes the command to their respective HILs. Arrows 730 and 740 illustrate that the registers are changed to update the associated hardware resources 1 . . . N.

However, the path taken by the command issued by the administrator 701 may change if a different routing table was used, even if the different command also implemented a broadcast interface. For example, if the administrator 701 requested to change a setting or function associated with routing table 2, the path would change. Routing table 2 also uses a broadcast interface that requires each of the resources (R0-RN) to be updated, but only has one target or responsible switch module—switch module 1. In this case, after switch module 1 receives the command (i.e., arrow 710), it does not need to perform a sideband transaction using the DRL to any other switch module. Instead, the IOMC of switch module 1 recognizes it is the only responsible switch module and forwards the command to the HIL for distribution to all of the hardware resources. That is, the HIL of switch module 1 would update each of the hardware resources 1-N regardless of where the resources are physically located.

In one embodiment, the routing tables may be dynamically updated as the fabric of the virtual switch 180 changes. For example, the switch modules have the ability to discover and update the different look-up tables of the bridge elements 120 when switch modules are removed or added to the switch 180. This process may advantageously be used to also update the routing tables 142. If a switch module is replaced, the bridge elements 120 may discover change in the switch's 180 network topology. The IOMCs 140 may detect this change and also update the routing tables 142. For example, referring to routing table 1 of FIG. 5, if a new switch module 3 and hardware resource 7 are added, routing table 1 may be updated to define that switch module 3 is the responsible switch for resource 7. Alternatively, routing table 1 may be amended, for example, such that switch module 2 is responsible for resources 6 and 7.

CONCLUSION

The different switch modules making up a distributed virtual switch may route configuration commands for hardware resources to different modules within the virtual switch using a distribution and routing layer. At least one of the switch modules maintains a routing table that defines which switch modules are responsible for which hardware resources. The switch module uses the routing tables to forward the commands on the distribution and routing layer to the responsible switch module which then ensures that the relevant hardware resources are configured.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of routing commands in a distributed switch that includes a plurality of switch modules, comprising:
 receiving a command on a first switch module of the plurality of switch modules, the command instructing the distributed switch to configure a data transfer speed setting for a first one of a plurality of hardware elements in the distributed switch;
 determining a target switch module of the plurality of switch modules that is responsible for the first hardware element based on a routing table, wherein the routing table comprises a list assigning each of the plurality of hardware elements to a respective one of the plurality of switch modules;
 routing the command from the first switch module to the target switch module, wherein the plurality of switch modules is interconnected within the distributed switch by a fabric;
 forwarding the command to a hardware interface layer on the target switch module, wherein logic in the hardware interface layer is configured to communicate with a register that stores the data transfer speed setting of the first hardware element; and
 configuring the first hardware element using the target switch module based on the received command, wherein the first hardware element is not physically located on the target switch module.

2. The method of claim 1, wherein, each of the plurality of switch modules is a separate physical hardware component that includes one or more bridge elements configured to route data between the plurality of switch modules.

3. The method of claim 1, wherein the first hardware element is at least one of: an Ethernet port, a PCIe connection, PCIe port, bridge element, and an uplink manager.

4. The method of claim 1, wherein each of the plurality of switch modules include a coherent copy of the routing table.

5. The method of claim 1, wherein the plurality of switch modules in the distributed switch enable communication between a plurality of computing systems and at least one of an Ethernet network and a PCIe slot.

6. The method of claim 5, wherein each of the plurality of switch modules transfer data that is based on at least two different communication protocols.

7. The method of claim 1, wherein the list assigns multiple hardware elements to one of the switch modules.

8. A method of routing commands in a distributed switch that includes a plurality of switch modules, comprising:
 receiving a command on a first switch module of the plurality of switch modules, the command instructing the distributed switch to configure a data transfer speed setting for a first one of a plurality of hardware elements in the distributed switch;
 determining a target switch module of the plurality of switch modules that is responsible for the first hardware element based on a routing table, wherein the routing table comprises a list assigning each of the plurality of hardware elements to a respective one of the plurality of switch modules, and wherein each of the plurality of switch modules include a coherent copy of the routing table;
 routing the command from the first switch module to the target switch module, wherein the plurality of switch modules is interconnected within the distributed switch by a fabric;
 forwarding the command to a hardware interface layer on the target switch module, wherein logic in the hardware interface layer is configured to communicate with a register that stores the data transfer speed setting of the first hardware element; and
 configuring the first hardware element using the target switch module based on the received command, wherein the first hardware element is not physically located on the target switch module.

* * * * *